June 18, 1957     G. A. BEASLEY     2,796,000

METHOD OF MAKING OPHTHALMIC LENS

Filed Nov. 8, 1952

*INVENTOR.*
*George A. Beasley.*

BY

*ATTORNEY*

United States Patent Office 2,796,000
Patented June 18, 1957

2,796,000
METHOD OF MAKING OPHTHALMIC LENS

George A. Beasley, Dayton, Ohio, assignor to The Univis Lens Company, Dayton, Ohio, a corporation of Ohio Application November 8, 1952, Serial No. 319,565

4 Claims. (Cl. 88—54)

My invention relates to multifocal ophthalmic lenses and methods of making the same. It has to do particularly with the making of cataract lenses, though it is not limited thereto.

One of the objects of this invention is to provide a cataract lens, and a method for making same, wherein a large range of strong convex curves can be used without sacrificing cosmetic effect.

Another object of this invention is to provide a cataract lens, and a method for making the same, wherein a greater range of segment locations and balance lenses may be used.

Still another object of this invention is to provide a cataract lens which is of such a construction that it may be economically made from standard ophthalmic lens blanks and yet be of light weight construction.

In its preferred embodiment, my invention contemplates the making of a cataract lens by the forming of a temporary composite lens blank by joining two standard main blanks of optical glass at mating optical surfaces thereon, and by then grinding a third optical surface on the composite blank so as to intersect the mating surfaces of the main blanks. Such intersection of surfaces causes one of said main blanks to become ring-shaped, and the ring-shaped main blank is then disconnected from the other main blank at their cemented joining surfaces. The resulting ring-shaped blank is then permanently fused to a third main blank of optical glass which is provided with an optical surface adapted to mate with one of the optical surfaces on the ring-shaped blank. The result is a permanent composite blank with extra thickness near its periphery. Such extra thickness permits the grinding of a relatively highly curved optical surface on the front surface of my composite blank, with the blank at the same time being relatively thin throughout its central area.

Further objects and advantages of the present invention will be apparent from the following description, reference being had to the accompanying drawings wherein a preferred form of embodiment of the invention is clearly shown.

Figure 1:
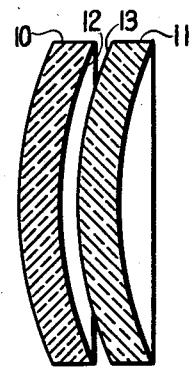
Fig. 1 is a sectional view taken through two blanks of optical glass having mating optical surfaces.
Figure 2:
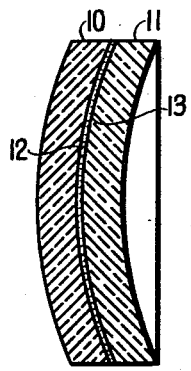
Fig. 2 is a sectional view showing the same two blanks after they have been cemented together to form a temporary composite blank.
Figure 3:
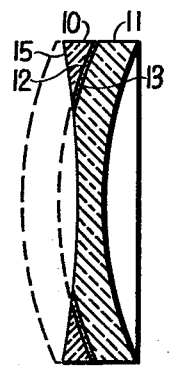
Fig. 3 is a sectional view showing the composite blank with a third optical surface ground thereon to form one of the main blanks substantially in the shape of a ring.
Figure 4:
Fig. 4 is a sectional view showing the ring-shaped main blank removed from the other blanks.

Referring further to the drawings and more particularly to Fig. 1, two lens blanks 10 and 11 of optical glass are shown in vertical section having mating optical surfaces 12 and 13 ground respectively thereon to constitute the first step in my method of making a cataract lens blank. The second step of the process consists in temporarily cementing the blanks 10 and 11 together at their mating optical surfaces 12 and 13, as seen in Fig. 2. The thickness of the cement is exaggerated in the figure. It is preferable to use only a thin film of lens cement between the surfaces 12 and 13. The composite blank thus formed is provided with a third optical surface 15, which is formed by grinding into the convex side of the composite blank. Such third surface 15 extends across both the main blanks 10 and 11 to form the main blank 10 into substantially a ring-shaped blank seen in Fig. 3 at 10. It should be noted that at this stage the ring-shaped main blank 10 is still cemented to the other main blank 11. The next step consists of removing the ring-shaped main blank 10 from the other blank 11 by separating them at their cemented mating surfaces. Fig. 4 shows the ring-shaped blank after it has been removed. The main blank 11 is then discarded as it has served its purpose as a supporting medium for the main blank 10 during the grinding of surface 15.

Figure 5:
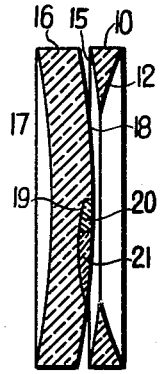
Fig. 5 is a sectional view showing a third blank of optical glass with a surface formed thereon to conform with a surface on the ring-shaped blank.
Figure 6:
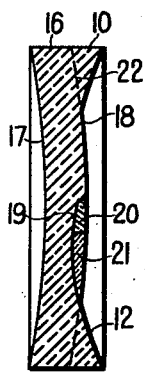
Fig. 6 is a sectional view showing the third main blank with the ring-shaped blank secured thereto to form a composite main blank.

A third main blank of optical glass is shown at 16 in Fig. 5. Blank 16 is provided with a finished optical surface 18 formed on one of its faces. As a matter of choice, this blank can be provided with a countersink as shown at 19 in Fig. 5, in which may be carried a composite button made up of segments 20 and 21 to provide minor fields for the lens. The minor field segment 21 is made of optical glass having an index of refraction suitable for a reading field for the lens. The glass used in the minor field segment 20 is of refractive index suitable for an intermediate field for the lens. It is not, however, intended to limit this invention to any particular multifocal combinations that may be provided on the third main blank 16.

Figure 7:
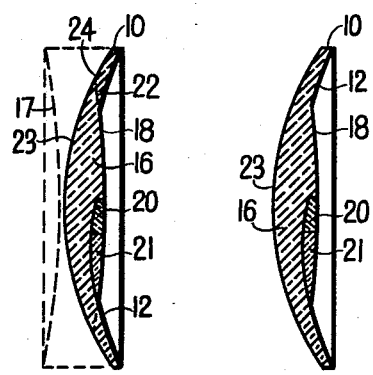
Fig. 7 is a sectional view showing a finished optical surface ground on the composite blank.

Fig. 5 shows the ring-shaped main blank 10 in aligned relation with the third main blank 16, so that the surfaces 15 and 18 are adjacently positioned. The surface 15 on the ring-shaped blank 10 is of a curvature suitable for joining it to the surface 18 of the standard ophthalmic lens blank 16. Dotted lines 22 delineate the cemented or fused surfaces. After the ring-shaped blank 10 is secured to the third mentioned main blank 16, the composite blank thus formed is ground down on its front face 17 to a finished optical surface 23, Fig. 7, which may be provided with a relative high degree of curvature. Fig. 7 shows optical surface 23 extending across the main blank 16 and curving backwardly across ring-shaped blank portion 10 as best seen at 24. This illustrates the reason for fusing the ring-shaped blank 10 to the surface 18. By so doing, additional thickness is added to the main blank 16 near its periphery and on its rear surface, so that the main blank 16 will be suitable for a large range of strong convex curves, such as the one shown at 23. For example, if the extra thickness at the periphery of blank 16 was not provided by the ring-shaped blank 10, a much shallower curve 23 would have to be ground thus limiting the range of powers for which the blank could be used. If the ring-shaped blank 10 were not used, a much greater center thickness would have to be maintained to provide a sufficient range of powers, with the result that such thick centered lens would be cosmetically undesirable.

Figure 8:
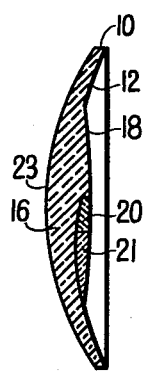
Fig. 8 is a sectional view of a finished lens blank.
Figure 9:
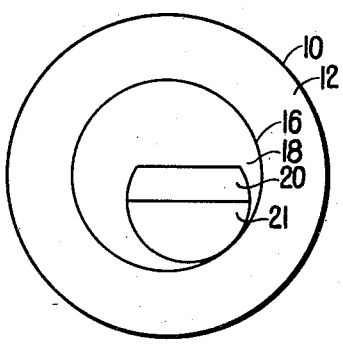
Fig. 9 is a front elevational view of a finished lens blank.
Figure 10:
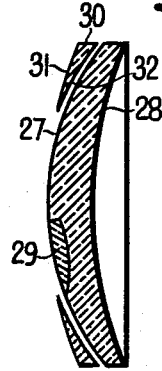
Fig. 10 is a sectional view of a separate embodiment of the present invention.
Figure 11:
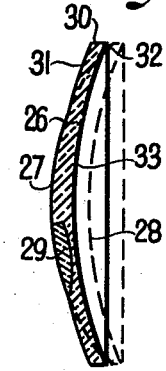
Fig. 11 is a second sectional view of the embodiment of Fig. 10, showing the finished lens.

Figs. 8 and 9 show a finished cataract lens blank formed in accordance with the present invention.

It should be noted that optical blanks made in accordance with the present invention can be supplied to lens finishers with various curvatures for the rear optical surfaces 12 and 18.

In summarizing the advantages of the cataract lens of this invention and a method of making it, it will be noted that the steps of manufacture as outlined are limited to simple grinding operations performed on standard blanks of optical glass. The steps of manufacture, as outlined, all tend to minimize to a negligible amount the imperfections and difficulties attending the manufacture of heretofore proposed lenses, thus rendering the cost of manufacture as well as the care and skill in the process, less expensive and less difficult. A resulting blank is adapted for commercial distribution and for grinding and polishing to prescription by any skilled finisher of lenses. As the joinder of parts of the lens may be made invisible, the finished lens is without disturbing elements. Although the process of manufacturing of these blanks is simple and inexpensive, they will provide a finished cataract lens of light weight having a high degree of cosmetic effect.

While the form of embodiment of the present invention as herein disclosed constitutes a preferred form, it is to be understood that other forms might be adopted, all coming within the scope of the claims which follow:

I claim:

1. A method of forming a cataract lens blank comprising forming an optical surface on one side of a main blank of optical glass, temporarily securing said optical surface to a mating surface of a second blank to form a composite blank, forming an optical surface on the opposite side of the main blank of such depth as to intersect said mated surfaces to form said main blank substantially as a ring, separating the ring-shaped blank from the other blank at the junction of the temporarily secured optical surfaces, forming on a third main blank of optical glass an optical surface to mate with one of said optical surfaces on the ring-shaped main blank, and securing the third main blank to the ring-shaped main blank at their mating surfaces.

2. A method of forming a cataract lens blank comprising forming an optical surface on one side of a main blank of optical glass, temporarily securing said optical surface to a mating surface of a second blank to form a composite blank, forming an optical surface on the opposite side of the main blank of such depth as to intersect said mated surfaces to form said main blank substantially as a ring, separating the ring-shaped blank from the other blank at the junction of the temporarily secured optical surfaces, forming on a third main blank of optical glass an optical surface to mate with one of said optical surfaces on the ring-shaped main blank, and permanently fusing the third main blank to the ring-shaped main blank at their mating surfaces.

3. A method of forming a cataract lens blank comprising forming an optical surface on one side of a main blank of optical glass, temporarily securing said optical surface to a mating surface of a second blank to form a composite blank, forming an optical surface on the opposite side of the main blank of such depth as to intersect said mated surfaces to form said main blank substantially as a ring, separating the ring-shaped blank from the other blank at the junction of the temporarily secured optical surfaces, forming on a third main blank of the same optical glass as used in the ring-shaped main blank an optical surface to mate with one of said optical surfaces on the ring-shaped main blank, and securing the third main blank to the ring-shaped main blank at their mating surfaces.

4. A method of forming a cataract lens comprising forming an optical surface on one side of a main blank of optical glass, temporarily securing said optical surface to a mating surface of a second blank to form a composite blank, forming an optical surface on the opposite side of the main blank of such depth as to intersect said mated surfaces to form said main blank substantially as a ring, separating the ring-shaped blank from the other blank at the junction of the temporarily secured optical surfaces, forming on the rear face of a third main blank of optical glass an optical surface to mate with one of said optical surfaces on the ring-shaped main blank, securing the third main blank to the ring-shaped main blank at their mating surfaces, and forming on said semi-finished composite lens blank an optical surface that extends on the front face of said third main blank portion and that curves rearwardly on said ring-shaped main blank portion.

References Cited in the file of this patent

UNITED STATES PATENTS

| | | |
|---|---|---|
| 795,425 | Bowers | July 25, 1905 |
| 1,396,303 | Walsh | Nov. 8, 1921 |
| 2,052,825 | Haussmann | Sept. 1, 1936 |
| 2,053,551 | Culver et al. | Sept. 8, 1936 |
| 2,447,068 | Hammon | Aug. 17, 1948 |
| 2,517,609 | Tillyer | Aug. 8, 1950 |
| 2,518,099 | Tillyer | Aug. 8, 1950 |